United States Patent
Kastell

(10) Patent No.: US 9,821,509 B2
(45) Date of Patent: Nov. 21, 2017

(54) METHOD AND DEVICE FOR PRODUCING AN INTERIOR COVERING PART

(71) Applicant: Faurecia Innenraum Systeme GmbH, Hagenbach (DE)

(72) Inventor: Friedhelm Kastell, Katzwinkel (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 1033 days.

(21) Appl. No.: 13/953,611

(22) Filed: Jul. 29, 2013

(65) Prior Publication Data

US 2015/0027622 A1 Jan. 29, 2015

(51) Int. Cl.
*B29C 53/04* (2006.01)
*B29C 63/02* (2006.01)
*B29L 31/30* (2006.01)

(52) U.S. Cl.
CPC .............. *B29C 63/02* (2013.01); *B29C 53/04* (2013.01); *B29L 2031/3005* (2013.01); *Y10T 156/1039* (2015.01)

(58) Field of Classification Search
CPC ......... B32B 37/10; B32B 37/18; B32B 37/06; B29C 53/04; B29C 63/02
See application file for complete search history.

(56) References Cited

U.S. PATENT DOCUMENTS

| | | | |
|---|---|---|---|
| 4,350,545 A * | 9/1982 | Garabedian | B32B 37/1018 156/285 |
| 4,378,265 A | 3/1983 | Kiss | |
| 5,614,285 A * | 3/1997 | Gardill | B29C 70/345 428/131 |
| 2003/0030188 A1* | 2/2003 | Spengler | B29C 37/0032 264/458 |
| 2003/0155685 A1* | 8/2003 | Spengler | B29C 43/36 264/250 |
| 2003/0189271 A1* | 10/2003 | Kieltyka | B27N 3/10 264/255 |
| 2005/0126703 A1 | 6/2005 | Smith et al. | |

FOREIGN PATENT DOCUMENTS

| | | |
|---|---|---|
| EP | 1815977 A1 | 8/2007 |
| GB | 1366494 | 11/1971 |
| JP | 2004058303 A | 2/2004 |
| WO | WO0238352 A2 | 5/2002 |
| WO | WO2013004400 A2 | 1/2013 |

OTHER PUBLICATIONS

European Search Report for corresponding application No. EP 13 00 3767, dated Jul. 1, 2014, 7 pages.

* cited by examiner

*Primary Examiner* — Daniel McNally
(74) *Attorney, Agent, or Firm* — Reising Ethington P.C.

(57) ABSTRACT

A device and method for producing an interior covering part with a carrier component of a fiber molding material and a decorative film. The method may be carried out using the device and includes the steps of: in a first press tool with two tool halves, carrying out a first pressing together and forming of a semi-finished product provided for forming the substrate and of a semi-finished product provided for forming the decorative layer subject to forming a texture of a first surface of the decorative layer and because of this forming an intermediate product with a first forming state; cooling down a decorative layer portion of the intermediate product; and in a second press tool, forming a method end product with a second forming state.

7 Claims, 5 Drawing Sheets

METHOD AND DEVICE FOR PRODUCING AN INTERIOR COVERING PART

Figure 1:
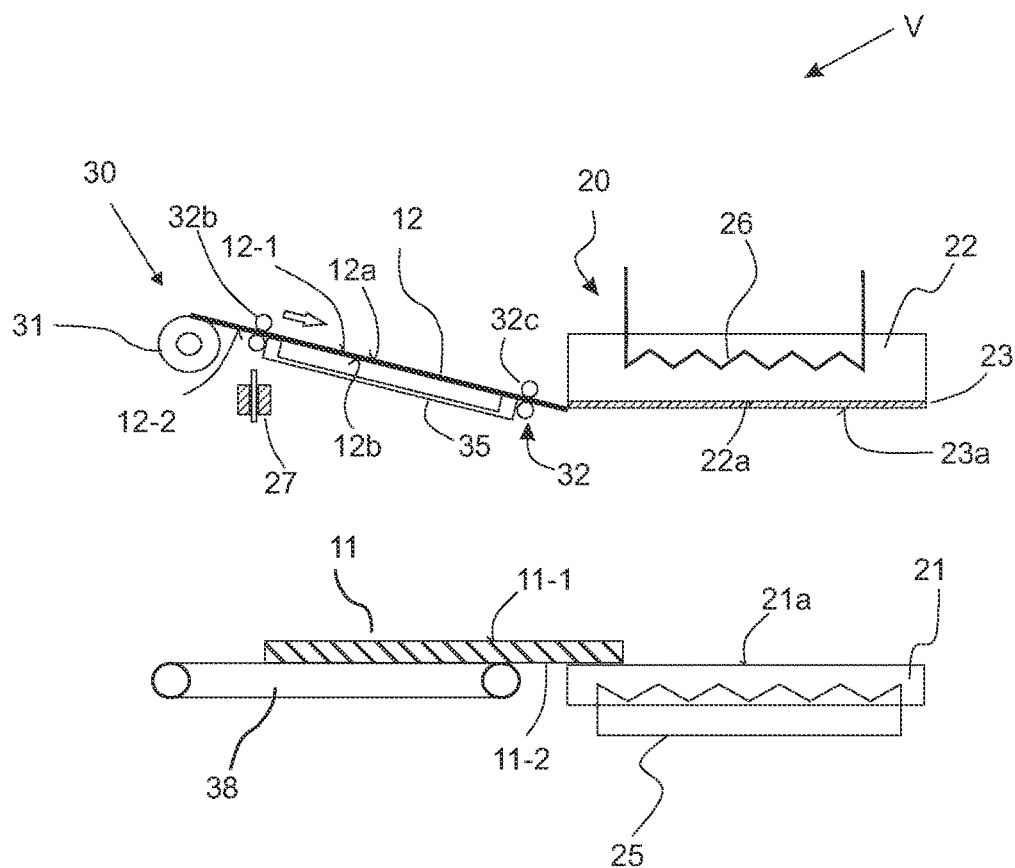

The present invention relates to a method and to a device for producing an interior covering part for a vehicle and in particular a motor vehicle.

Interior covering parts for vehicles with a carrier part and a decorative film are known from the prior art. Such an interior covering part can for example be a covering part for the inside of a door of the vehicle, a headlining, a dashboard or an instrument panel in each case for the vehicle.

The object of the invention is to provide a method and a device for producing an interior covering part with which a haptically as well as visually advantageous form of the surface of the interior covering part on the user side is ensured.

This object is solved with the features of the independent claims. Further embodiments are stated in the subclaims referenced to these.

According to the invention, an interior covering part is produced which comprises a carrier component and a decorative film or a decorative layer.

According to an aspect of the invention, a method for producing an interior covering part with a carrier component of a fibre moulding material, in particular a natural fibre moulding material and a decorative film, wherein the method comprises the following steps:

in a first press tool with two tool parts, carrying out a first compressing and forming of a semi-finished substrate product provided for forming the substrate and a semi-finished decorative layer product provided for forming the decorative layer subject to forming a texture or texturing of a first surface of the semi-finished decorative layer product and because of this forming an intermediate product with a first forming state; and
  cooling down of at least one thickness part region of the cross section of an intermediate product portion of the intermediate product located on the first surface of the semi-finished decorative layer product through cooling-down of a first surface of the latter by means of a cooling medium,
  in a second press tool with two tool parts, carrying-out of a second compressing and further forming of the semi-finished substrate product and of the semi-finished decorative layer product for forming the interior covering part (B), wherein the thickness part region of the intermediate product portion located on the first surface because of the cooling-down has a lower temperature than during the forming in the first press tool, so that a method end product is formed in a second forming state of the substrate and the decorative layer with the texturing of the first surface.

The texture of a first surface of the decorative layer is provided in such a manner that it forms a graining.

According to an embodiment of the method according to the invention it is provided that the cooling medium is formed of water.

According to an embodiment of the method according to the invention it is provided that a shaping forming surface of a second press forming tool half or of a second tool part of the first press tool, which is provided for receiving the decorative film semi-finished product, is coated with a non-stick coating.

According to an embodiment of the method according to the invention it is provided that the surface texture of the decorative layer is formed upon the opening of the first press tool, wherein the intermediate product upon opening of the first press tool altogether is held in a flat position that remains the same between the two tool parts of the first press tool.

According to an embodiment of the method according to the invention it is provided that as material for the carrier part semi-finished product a fibre moulding material with a grammage of 80 to 4,000 g/m² is used.

According to an embodiment of the method according to the invention it is provided that as material for the carrier part semi-finished product a fibre moulding material is used, which comprises natural fibres with a component of 40 percent by weight to 60 percent by weight in each case based on its total weight and fibres of one or a plurality of thermoplastic polymers with a component of 60 percent by weight to 40 percent by weight.

According to a further aspect of the invention, a device for producing an interior covering part with a carrier component and a decorative layer is provided, wherein the device comprises:

a first press tool with two tool halves each with a shaping contour surface for forming an intermediate product with a first forming state from a semi-finished product for forming the carrier component and a semi-finished product for forming the decorative film,
  a cooling device with an output device for applying a coolant to a first surface of the intermediate product in order to cool the first surface,
  a second press tool with two tool halves each with a shaping contour surface for forming an interior covering part with a second forming state, wherein the second forming state is created through a contour forming of the intermediate product.

According to an embodiment of the device according to the invention it is provided that the shaping contour surfaces of the second press tool are formed in size and shape such that an intermediate product, which has been brought into the first forming state through the two tool parts of the first press tool, is formed into the second forming state.

According to an embodiment of the device according to the invention it is provided that the spraying device comprises a spraying head for applying the cooling medium onto a surface of the semi-finished decorative layer product, in particular a liquid coolant.

According to an embodiment of the device according to the invention it is provided that a shaping forming surface of a tool half of the first press tool is coated with a non-stick layer.

According to the method according to the invention or with the production device according to the invention a semi-finished substrate product provided for forming a carrier component and a decorative film or semi-finished decorative layer product provided for forming a decorative layer are joined together through compression in a first step and because of the shape of contour-providing forming surfaces of the tool parts of a first press tool used in each case formed into an intermediate product with a first forming state subject to forming a texture of a first surface of the decorative film or of the semi-finished decorative layer product. In a further step, a forming of the intermediate product with the first forming state into a method end product with a second forming state takes place. Preferentially it is provided that in this further step no further texture of graining in the first surface of the decorative layer is formed. Here it can be provided in particular that the forming surface of the second tool part of the second press tool, which the decorative film or the semi-finished decorative layer product contacts during the forming of the intermediate product, has a smooth that is untextured surface in its areal extension. This forming surface of the second tool part in particular therefore has no surface texturing which is to be impressed on the surface of the decorative film or semi-finished decorative layer product contacting it. Between these two forming steps, a cooling-down at least of a thickness region of the decorative layer is provided, with which the texture that was created in the first forming step of the decorative layer surface is protected from further forming.

It can be provided, in particular, furthermore that the forming surface of the first tool part of the first press tool, which the decorative film or the semi-finished decorative layer product contacts during the forming into the first forming state of the intermediate product, has a smooth, i.e. untextured surface in its areal extension. This forming surface of the second tool part of the first press tool thus has no surface texturing in particular, which is to be impressed onto the surface of the decorative film or semi-finished decorative layer product contacting it. The surface texture or graining is created during the opening of the first press tool or of the calibrating tool through residual adhesion forces and the resilient recovery of the pressed fibre moulding material supported by this. The surface texture of the semi-finished decorative layer product or of the decorative film of the intermediate product that was created through pressing the semi-finished decorative layer product or of the decorative film and the semi-finished substrate product is then obtained, i.e. stabilised through the cooling-down of the film surface for a following method step, in which the surface of the semi-finished decorative layer product or of the decorative film located on the outside is cooled.

According to the method according to the invention a pressing of the semi-finished products each of which are used as base materials or semi-finished products for the carrier component and the decorative layer takes place at a first temperature. During the pressing, a forming into the first intermediate product which with respect to the shape of the interior covering part to be produced is only partial occurs because of the shape of the forming contour surfaces of the first press tool. This first forming takes place in particular to a degree that the finished part thickness is reached almost and preferentially with a maximum of 30 percent deviation. This means that in the first forming step the semi-finished products are compressed to a dimension that on each point along the areal extension of the intermediate product its thickness deviates to a maximum from the thickness of the product produced in the second press tool at the respective points.

With the following cooling-down of at least the semi-finished decorative layer product or of the decorative film, a stabilising or retaining of the surface texture created through the opening of the first press tool takes place, i.e. of the structuring of the surface of the decorative layer of the intermediate product or of the decorative film, which is thus present on carrying out the further forming of the substrate and of the decorative film in a second press forming tool. The cooling-down in this case takes place in a manner such that a stretchability of the grained surface of the decorative layer can be retained, so that following this an end product with a geometry to be described three-dimensionally can be created in the first place. Here it can be accepted that through the cooling-down the drapeability diminishes. Here it can be provided in particular that the drapeability, i.e. the possibility of distortion of the intermediate product, diminishes between 1 percent and 50 percent. Here, drapeability or the possibility of the distortion is to mean in particular a maximum stretching of the intermediate product in a direction with respect to the length of the intermediate product in this direction, at which the placing of said intermediate product on a tool part of the second press tool is still permissible in order to obtain an end product that is still acceptable with respect to the quality of the surface texturing.

In an embodiment of the method according to the invention, no graining, as described above, is impressed onto the surface of the decorative layer of the intermediate product or the decorative film located on the outside, but this is created during the detaching of the intermediate product from the surface of the tool part of the first press tool. The cooling is to prevent the forming forces during the forming in the second press tool to destroy the surface texture created or impress the surface texture of the second tool.

Through the method according to the invention or the device according to the invention the interior covering part can be produced with a surface texture or a topography which has an arithmetic mean roughness value Ra in the region of 10 µm to 80 µm and preferentially an arithmetic mean roughness value Ra in the range from 10 to 50 µm and particularly preferred in the range 20 µm to 40 µm.

When the coolant as described above evaporates upon contact, outflowing coolant flows do not create any undesired textures on the surface to be textured.

Figure 2:
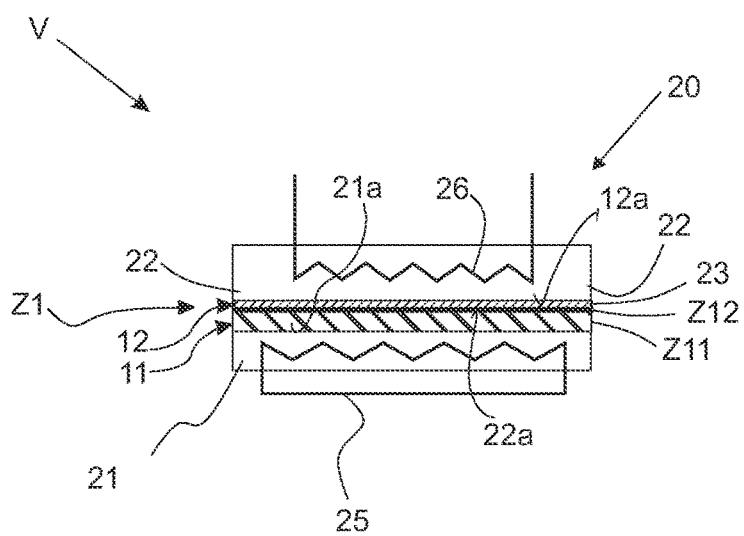
Figure 3:
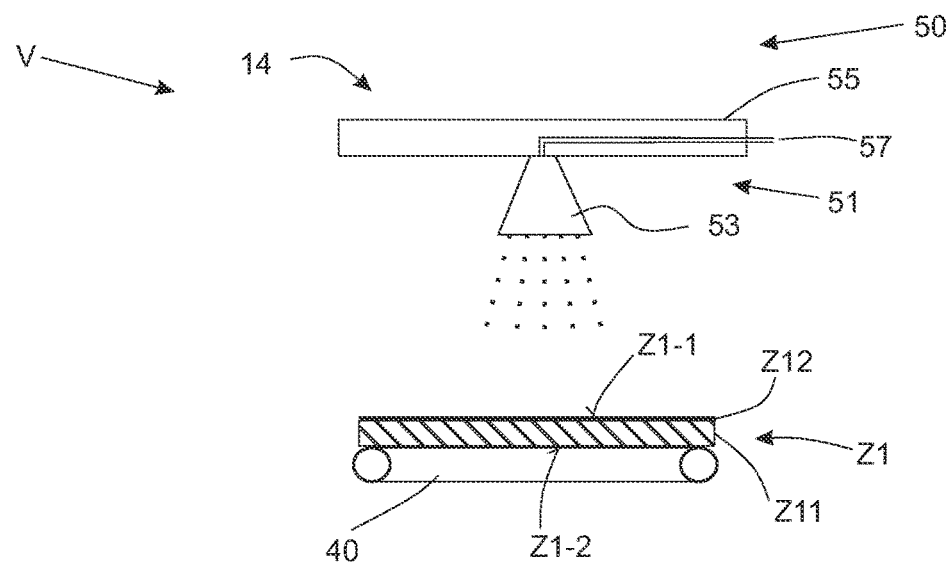
Figure 4:
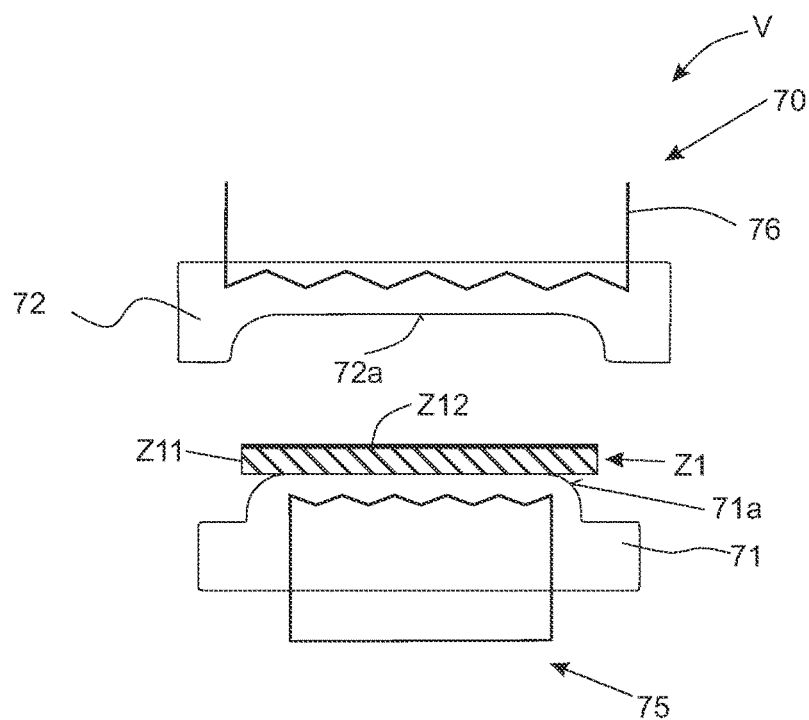
Figure 5:
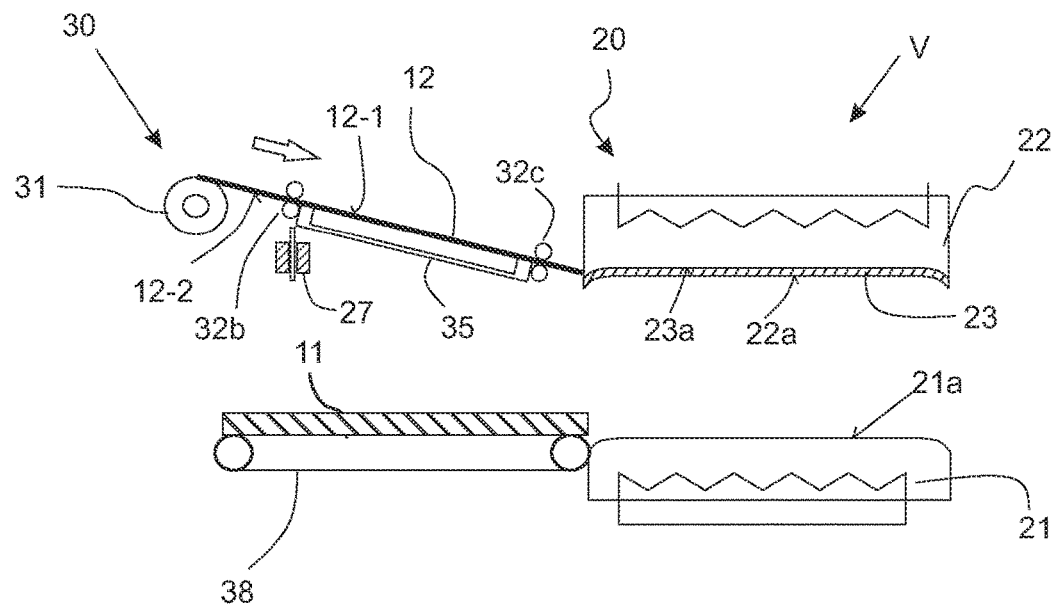
Figure 6:
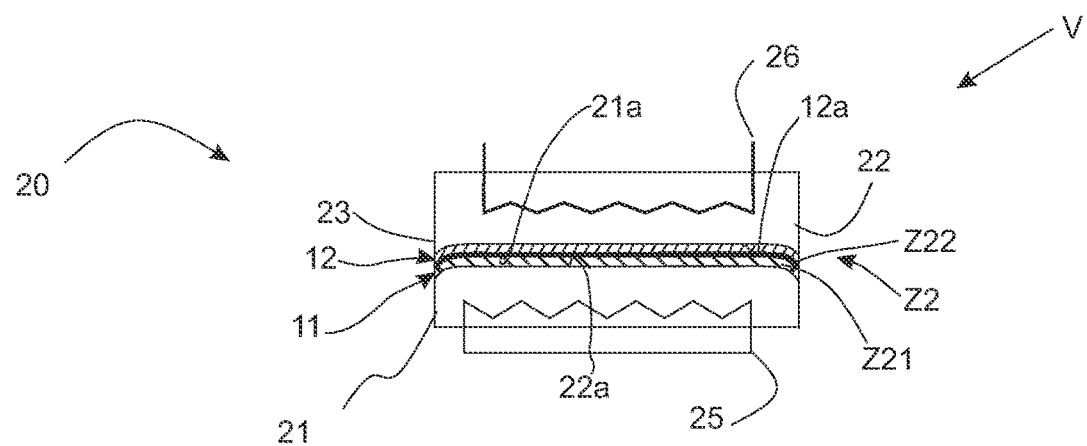
Figure 7:
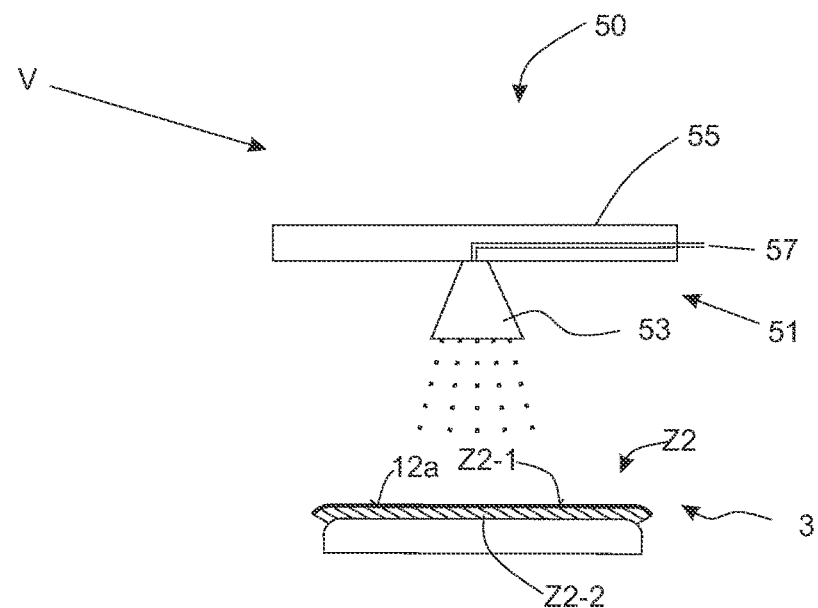
Figure 8:
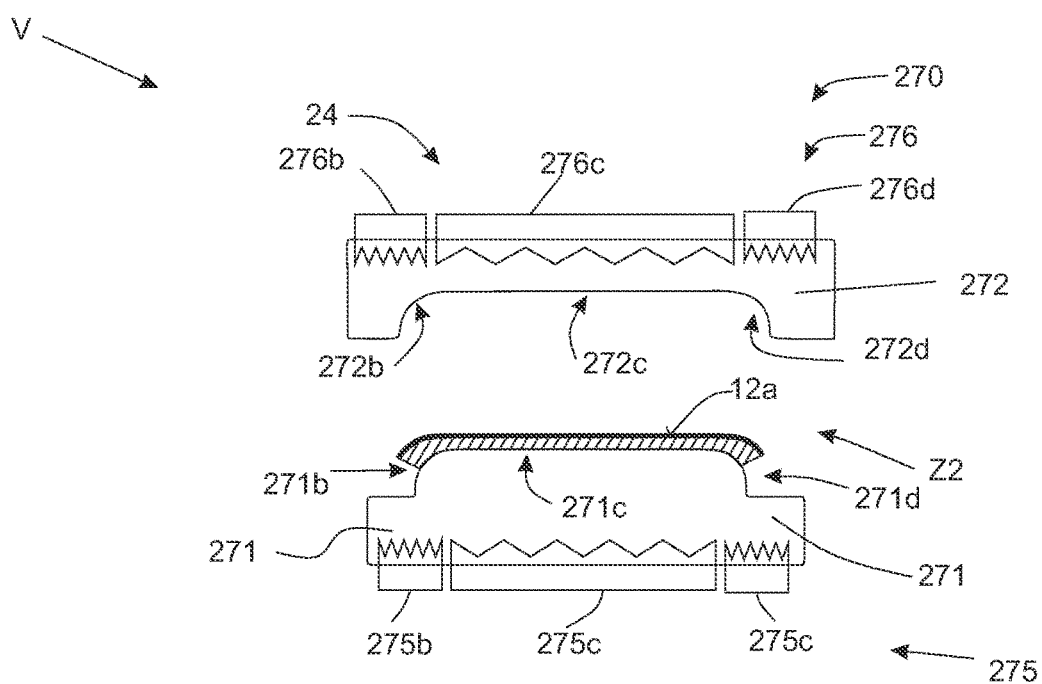
Figure 9:
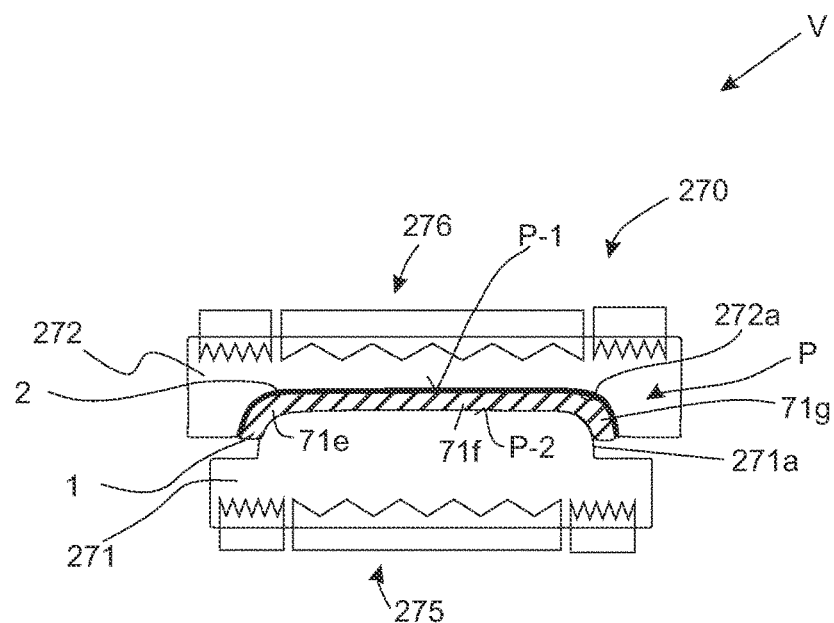
Figure 10:
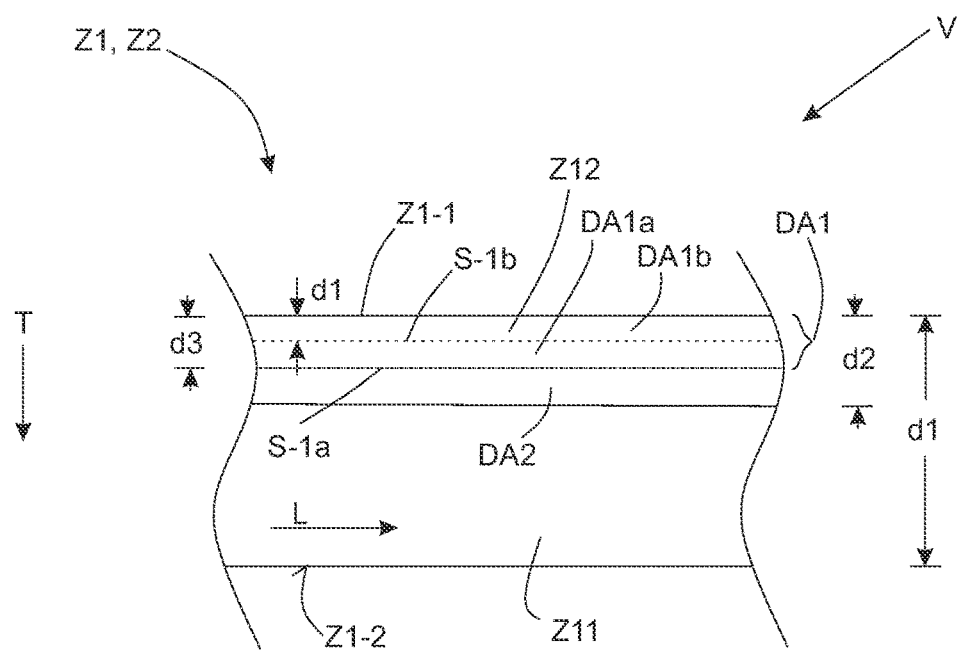

The embodiments according to the invention are described in the following by means of Figures, which show:

FIG. 1 a schematic representation of an embodiment of a first press tool of the production device for producing an interior covering part according to the invention, wherein the first press tool is shown in an open position and wherein the shaping forming surfaces of the tool parts are shaped such that with the first press tool an intermediate product with surfaces that are flat in their areal extensions can be produced, FIG. 2 a schematic representation of the first press tool in the embodiment of FIG. 1 in its closed state, in which the tool parts of said press tool have been locked up, FIG. 3 a schematic representation of an embodiment of a cooling device of the production device according to the invention, which is arranged on a first intermediate product produced with a first press tool according to FIG. 1, FIG. 4 a schematic representation of an embodiment of a second press tool of the production device according to the invention, which is in an open state and into which an intermediate product is inserted, which is produced with a first press tool embodied according to FIG. 1, and with which particular with respect to the shape the end product is produced, FIG. 5 a schematic representation of with respect to the FIG. 1 a further embodiment of a first press tool of a production device for producing an interior covering part according to the invention, wherein the first press tool is shown in an open position and wherein the shaping forming surfaces of the tool parts are shaped such that with the first press tool a second intermediate product with curved surfaces or surface contours can be produced, FIG. 6 a schematic representation of the first press tool in the embodiment of FIG. 5 in its closed state, in which the tool parts of said press tool are locked up, FIG. 7 a schematic representation of an embodiment of a cooling device of the production device according to the invention, which is arranged on an intermediate product produced with a first press tool according to FIG. 5, FIG. 8 a schematic representation of an embodiment of a second press tool of the production device according to the invention, which is in an open state and into which an intermediate product is inserted, which is produced with a first press tool embodied according to FIG. 6, FIG. 9 a schematic representation of an embodiment of a second press tool of the production device according to the invention, which is in a closed state and into which an intermediate product is inserted, which is produced with a first press tool embodied according to FIG. 1 or FIG. 4, and with which in particular with respect to the shape the end product is produced, FIG. 10 a sectional representation of a detail of an intermediate product represented according to the production device of FIG. 2.

According to the invention, an interior covering part is produced which comprises a substrate or a carrier part component and a decorative film or a decorative layer. For producing the interior covering part, a substrate of fibre moulding material, in particular a natural fibre moulding material, and a decorative film or a decorative layer are formed in two steps, wherein these are pressed together in a first step of the two steps and in particular hot-pressed.

As starting material or semi-finished product for a substrate, which is used for producing the carrier component, a fibre moulding material in the form of a plastic mat with fibre components and especially a polypropylene (PP)-bound fibre mat with natural fibres and/or plastic fibres, a polypropylene (PP)-bound fibre mat with ceramic, carbon or glass fibres is used especially. This (substrate) can be plasticisable in particular through the supply of heat. When using a polypropylene (PP)-bound fibre mat as substrate, this preferentially comprises a material component of a fibre material, which is preferentially formed of natural fibres or glass fibres as well as plastic or carbon fibres and in particular with polypropylene (PP)-fibres (binding function). Alternatively or additionally nature fibre PP (NFPP) or glass fibre PP can be used as fibre mat. As natural fibres, fibres of wood, kenaf, hemp, jute, flax, china grass (*boehmeria nibea*), rattan, soya, ocra (*abelmoschus esculentus*), banana, bamboo, coconut, coir, cotton, curaua (*ananas lucidus*), abaca (*musa textilis*), pine, pineapple, raffia palm (*raphia farinifera*) and/or sisal can be used. Synthetic fibres can also be used. Chips of wood can also be used as starting material for the carrier material. As synthetic fibres, carbon fibres, fibres of polyester, acrylate, aramide, Twaron, Kevlar, Technora, vinylon, Cylon and/or polypropylene can be used. A combination of a plurality of types of the mentioned natural fibres or other fibres can also be used in the substrate. As part of the present invention, the term "polymers" comprises both homopolymers as well as copolymers of the mentioned polymer types.

The fibres of the fibre moulding material can be formed of: based on their respective total weight of 30 percent by weight to 70 percent by weight of natural fibres and 70 percent by weight to 30 percent by weight of fibres of one or a plurality of thermoplastic polymers, such as in particular fibres of polypropylene and/or propylene, copolymers and as appropriate additives such as binders, fillers and/or colorants, wherein the component of the optional additive can be 0.5 percent by weight to 15 percent by weight based on the total weight of the fibres or of the fibre moulding material.

According to the invention, it can be provided with these embodiments, however also generally, that the fibres are formed of one or a plurality of thermoplastic polymers as binder, which are plasticised during the hot pressing of the fibre moulding material used and solidify during the cooling-down so that the natural fibres are glued together or form a solid matrix, in which the natural fibres are embedded. Furthermore, the fibre moulding material used can in each case based on its total weight, contain 40 percent by weight to 60 percent by weight of natural fibres and 60 percent by weight to 40 percent by weight of fibres of one or a plurality of thermoplastic polymers.

The production of the carrier material or fibre moulding material provided according to the invention can be effected in that the natural fibres and as appropriate the further fibres of one or a plurality of thermoplastic polymers are initially intermixed and placed onto a placement surface and in particular onto a textile structure and in particular a thin support fleece or transport fleece. Generally, the textile structure can be a woven fabric, knitted fabric or fleece (non-woven material). For example, wet or air-laid or carded fleeces. The fleeces can contain natural or synthetic fibres or mixtures of natural and synthetic fibres. The mixing of the fibres among them can be performed in a turbulent airflow, for example in a swirling device. Following this, the mixture of fibres so created is mechanically compacted into a web in particular on the support surface, optionally aligned in a predetermined manner such as in particular along a uniform main direction and thus orientated and determined in its size. Since the fibres are laid on a thin support fleece or transport fleece, a two-layered fibre web, namely of a layer of fleece and a layer of fibres is present. The two-layered fibre web obtained is compacted into a needle-punched fleece by means of rolls and a needling device and made up into mats by means of a cutting device.

The fibre mats or mat-shaped fibre moulding materials used have a thickness of 5 to 30 mm, preferentially 10 to 20 mm and a grammage of 80 to 4,000 g/m$^2$, preferentially of 500 to 2,500 g/m$^2$, and particularly preferred of 1,200 to 2,200 g/m$^2$.

Preferentially, the fibres are preformed in a preparatory step or a step preceding the method into a mat-shaped initial semi-finished product for the substrate. Following this, by applying pressure and temperature a plastic mat material or a plastic mat is produced through melting of the plastic component for forming a plastic matrix, in which the fibres and the plastic matrix are joined together. In this form, the plastic mat can be made available to the method according to the invention or the device according to the invention as a semi-finished substrate product or a first or second layer.

The decorative film or the semi-finished decorative layer product used can be formed in single or multiple layers. The total thickness of the decorative film used is in the range from 40 to 1,000 μm, preferentially 60 to 200 μm and in particular 80 to 120 μm. The material of the decorative film used contains a polymer material. Here, "polymer material" is to mean a material containing more than 60% by weight, preferentially more than 80% by weight and if applicable up to 100% by weight of a polymer or a mixture of two or more polymers, based on the grammage of the material. The at least one polymer—also called matrixpolymer in the following—is a thermoplastic polymer or thermoplastic in the present exemplary embodiment which can be repeatedly, i.e. repeated and formed multiple times. The matrixpolymer however can also be selected from the group comprising polyolefins, polyethylene, polyacrylate, polypropylene, and/or mixtures thereof.

The carrier part semi-finished product or the fibre moulding material used, in particular the natural fibre moulding material, and the decorative film or the semi-finished decorative layer product used can each contain an identical thermoplastic and thus have a substantially equal yield point or softening temperature. It can be provided that different thermoplastics are used for the fibre moulding material, in particular the natural fibre moulding material and for the decorative film. In this case, however also generally, it can be provided that the fibre moulding material, in particular the natural fibre moulding material, and the decorative film have different yield points or softening temperatures. Practically, the thermoplastics can then be selected so that the thermoplastic of the decorative film has a higher yield point or softening temperature of the thermoplastic of the fibre moulding material, in particular of the natural fibre moulding material. According to an embodiment according to the invention, the yield point of the thermoplastic of the decorative film or of the semi-finished decorative layer product is maximally 10° C. than the thermoplastic of the fibre moulding material or of the carrier part semi-finished product.

Generally, the semi-finished decorative layer product or the decorative layer can be formed of a film. In particular, the semi-finished decorative layer product or the decorative layer can be a compact film or multi-layered composite film.

For forming the decorative layer or the semi-finished decorative layer product, a film layer of a suitable starting material can be used in particular.

With the method according to the invention, thermoplastic, preferentially PP-films are used for the film surfaces, so that the forming of the surface texturing takes place when detaching the semi-finished decorative layer product or the decorative film from the respective tool part of the first press tool preferentially with meltable surface layers of the semi-finished decorative layer product or the decorative film.

Apart from the semi-finished decorative layer product or the decoration layer and the semi-finished substrate product, at least one reinforcement layer, such as for example a layer of glass fibre fabric can be used in addition with the method according to the invention, which on placing the semi-finished product into the first press tool lay on that surface of the semi-finished substrate product which faces the decorative film or the semi-finished decorative layer product.

Joining the decorative layer and the substrate, i.e. the semi-finished decorative layer product and the carrier part semi-finished product optionally with the reinforcing layer is effected by initial melting of the decoration layer and the substrate and upon a placing of these on top of one another and pressing these in the first press tool with a pressure suitable for the application.

The internal covering part P to be produced is formed of a substrate 1 and a decorative layer 2 (FIG. 9) and altogether has a first surface P-1 and a second surface P-2, which is orientated opposite to the first surface P-1. When the interior covering part P to be produced is installed in the motor vehicle, the first surface faces the interior of the motor vehicle, thus forming a visual side of said motor vehicle. The first surface P-1 of the interior covering part P is formed by a first surface of the decorative layer 2 of the internal covering part P extending areally.

According to the invention, a device V and a method for producing an internal covering part P with a carrier component 1 of a fibre moulding material and a decorative layer 2 or a decorative film are provided, wherein between the carrier component 1 and the decorative layer 2 a reinforcing layer can be located. The device 1 or the method is shown in the FIGS. 1 to 5 respectively.

FIG. 1 shows a semi-finished product feeding device 30 for feeding a semi-finished product 11 provided for forming the substrate 1 of the component P (FIG. 9) to be produced and a semi-finished product 12 provided for forming the decorative layer 2. In addition, a first press tool 20 as part of the device V according to the invention for producing an interior covering part P with a first tool part 21 and a second tool part 22 is shown in FIG. 1. The first tool part 21 has a first shaping forming surface 21a and the second tool part 22 has a second shaping forming surface 22a. When feeding the semi-finished product 11 to the first press tool 20, a first surface 11-1 of the semi-finished product 11 faces the second tool part 22 or a semi-finished decorative layer product 12 located near that, while a second surface 11-2 of the semi-finished product 11 faces the first tool part 21. Analogously, a first surface 12-1 of the semi-finished product 11 faces the second tool part 22 when feeding the semi-finished product 12 to the second press tool 20, while a second surface 11-2 of the semi-finished product 12 faces the first tool part 21 or a semi-finished substrate product 21 located near that.

The interior covering part P to be produced can comprise its assembly side or its second surface P-2, which is located opposite to the first surface P-1 of the same, can comprise at least one device for joining the interior covering part P to parts of the body or a carrier component of the same, such as a car door, the front part of the body on the cockpit side or the roof of the body. Such a device can comprise an attachment part, which can be embodied as a projection, or a depression and bore. Fastening or joining the interior covering part to the body or a carrier component or a combination of the same can be provided.

The first surface P-1 of the decorative layer 1 or of the interior covering part P generally has a surface that is contoured relief-like over the areal extension in order to create a special haptic and/or a special appearance. Thus, the first surface P-1 has a surface texturing along the areal extension of the first surface P-1.

According to an embodiment of the production device V according to the invention, the shaping forming surface 22a of the second press forming tool half 22 of the first press tool 20, which is provided for receiving the decorative film semi-finished product 12, is coated with a non-stick layer 23, so that in this case the shaping forming surface 23a of the second press forming tool part 22 can be formed through the surface 23a of the non-stick layer 23. According to the invention, the surface texture on the decorative surface of the intermediate product and thus of the product P to be produced can be achieved in that the intermediate product Z1, Z2 is detached from the surface 23a of the non-stick layer 23. This is effected in a state in which the temperature of the decorative layer Z12 or Z22 is below the yield point or the melting temperature of the material or semi-finished product of the decorative layer Z12 or Z22, so that the surface texture to be produced is created.

Here it can be provided in particular that the temperature of the decorative layer Z12 or Z22 during opening and in particular at the time of the start of the opening of the first press tool 20 is at least 1.0 degree and maximally 10 degrees and in particular embodiments of the method at least 1.0 degree and maximally 5 degree below the yield point or the melt temperature of the material or semi-finished product Z12 or Z22 of the respective decorative layer. This can be accomplished in particular in that the second tool part 22 at least in a region running along the tool surface 22 has been brought to a temperature and an opening has a temperature which is at least 1.0 degree and maximally 5 degrees below the yield point or the melting temperature of the material or semi-finished product Z12 or Z22 of the decorative layer. Here it can be provided in particular that the temperature is held in the respective temperature range for at least 30 seconds up to the opening of the first press tool.

When detaching the decorative layer Z12 or Z22 from the tool surface 22a and if applicable from the surface 23a of the non-stick layer 23, the decorative layer Z12 or Z22 is located at approximately the same distance to the tool surface 22a or if applicable the surface 23a over the areal extension of the same, i.e. preferentially the decorative layer Z12 or Z22 is not peeled off the tool surface 22a or if applicable the surface 23a. It can be provided, in particular, that the decorative layer Z12 or Z22 is held altogether by a clamping frame and that the clamping frame is removed from the tool part 22 with the decorative layer without position change of the clamping frame or of the decorative layer. In this way it is achieved that an intermediate product Z1, Z2 produced through the first press tool adheres to the tool part 22 only in the predetermined manner for forming the surface texture. When a non-stick layer 23 is present on the tool surface 22a, the non-stick layer 23 can be formed in particular of a Teflon layer or consist of Teflon. The Teflon layer can contain ceramic components in order to ensure the service life of the non-stick layer 23.

The orientation of the tool parts 21, 22 can differ in particular with respect to the direction of gravity. According to an embodiment of the device V according to the invention, the first press tool 20 of the same is orientated such that—as shown in FIG. 1—the first shaping forming surface 21a of the first tool part 21 of the first press tool 20 is orientated opposite to the direction of gravity and the second shaping forming surface 22a of the second tool part 22 faces said direction of gravity. According to a further embodiment of the device V according to the invention, the first press tool 20 of the same is orientated in the reverse order. According to a further embodiment of the device V according to the invention it can also be provided that the areal extensions in each case of the first shaping forming surface 21a and of the second shaping forming surface 22a run along the direction of gravity S.

The device V according to the invention furthermore comprises a cooling device 50 and a second press tool 70 with a first tool part 71 and a second tool part 72, with which an intermediate product Z1, Z2 produced with the first press tool 20 is contour-formed, i.e. a contour forming is carried out.

The first tool part 71 of the second press tool 70 comprises a first shaping forming surface 21a and the second tool part 72 comprises a second shaping forming surface 72a. Because of the pressing method with the first press tool 20, an intermediate product Z1 with a substrate Z11 and a decorative layer Z12 (FIG. 2), Z2 with a substrate Z21 and a decorative layer Z22 (FIG. 6) is present, which is placed into the second press tool 70 in accordance with the method according to the invention. A first surface Z1-1 or Z2-1 of the semi-finished product Z1 or Z2 faces the second tool part 72, while the second surface Z1-2 or Z2-2 of the semi-finished product Z1 or Z2 faces the first tool part 71. The first shaping forming surface 71a and the second shaping forming surface 72a are configured such that during the pressing operation because of the locking up of the tool parts 71, 72 the intermediate product Z1, Z2 located in between is formed with respect to its shape.

"Contour forming" here means that the shape and thus also the contour profile of the surfaces, i.e. of the first and of the second surface of the combination of the semi-finished product 11, 12 when forming the end product or interior covering part P is modified with regard to the respective intermediate product, i.e. for example with respect to the first or the second intermediate product Z1 and Z2. "Contour forming" thus means a forming of the areal extension of a semi-finished product or intermediate product Z1 subject to modifying the form or the curvature profile of the surface contour of the semi-finished product or intermediate product Z1, Z2.

Here it can be provided in particular that in the first press tool 20 a first intermediate product Z1 is produced, which in its areal extension is formed without curvature, as shown in FIG. 2. Alternatively to this, it can be provided that in the first press tool 20 a first intermediate product Z1 is produced, which in its areal extension is formed curved and can therefore be described three dimensional, as shown in FIG. 2.

Through the second press tool 70, 270, the respective intermediate product Z1, Z2 is formed altogether, so that a "contour forming" of the first intermediate product Z1 is realised. The "contour forming" of the intermediate product Z1, Z2 relates in particular a "contour forming" of the shape of the first surface 12a of the decorative layer 12 or Z12, Z22 of the intermediate product Z1, Z2 in the shape of the first surface 12a of the decorative layer 2 of the covering part P.

Through the designs of the first and of the second press tool 20 and 70, 270 respectively, "contour forming" in an embodiment of the method can be carried out in particular in such a manner that no change of the type of curvature and thus the introduction of a reversal point in the cross-sectional profile course of the intermediate product Z1, Z2 or of the covering part P or in the areal course of the surface 12a is introduced.

The curvature change of the 12a during the "contour forming" can be provided in particular in such a manner that there is a surface region of the surface 12a of the intermediate product Z1, Z2 and of the outer surface P-1 of the covering part P, at which the same point during the "contour forming" of the intermediate product Z1, Z2 to the covering part B covers a distance which amounts to at least the thickness of the covering part P or the decorative layer at the respective location of the respective point. In preferred embodiments, this amount can also amount to twice the thickness of the covering part P or of the decorative layer at the respective location of the point.

To this end, the shaping forming surface 21a of the first tool part 21 and the second shaping forming surface 22a have a surface shape that can be described three dimensionally. According to an embodiment of the method according to the invention or the device V according to the invention, an intermediate product Z1, Z2 with a curved course of their surfaces Z2-1, Z2-2 which are complementary to one another is formed from a flat first and second surface of the semi-finished products 11, 12, as is shown in the FIGS. 5 and 6.

In contrast with this, the first press tool 20 is embodied according to another embodiment of the method according to the invention or the device V according to the invention in such a manner that upon the moving together of the tool parts 21, 22 the press tool 20 brings about a compressing however no "contour forming" of the combination of the semi-finished products 11, 12 located in between these (FIGS. 1, 2, 3), so that the intermediate product has flat surfaces Z1-1, Z1-2.

According to an alternative embodiment of the device V according to the invention, the first press tool 20 is embodied in such a manner that during the locking up of the tool parts 21, 22 said press tool 20 brings about a compressing and additionally a contour shaping of the combination of the semi-finished products 11, 12 located between these (FIGS. 5, 6, 7), so that the intermediate product Z2 has surfaces Z2-1, Z2-2 which follow a curved course. In this case, the forming surfaces 21a, 22a are formed in such a manner that after a pressing method has been carried out with the first press tool 20, an intermediate product Z2 with surfaces Z2-1, Z2-2 following a curved course is created. Furthermore, the forming surfaces 71a, 72a of the second press tool 70 are formed in such a manner that the intermediate products Z2 subject to carrying out a further contour shaping into an end product P has surface curvatures which with respect to the surface curvatures of the intermediate product Z2 are more severe at least in portions.

According to the invention, the device V according to the invention comprises a cooling device 50, with which a cooling-down of at least one thickness part region of the decorative layer 2 of the respective intermediate product Z1, Z2 can be carried out by spraying a cooling medium onto a first surface Z1-1, Z2-1 of the same. The cooling medium can be liquid, gaseous or vaporous.

According to a further embodiment of the method according to the invention, cooling takes place only when the semi-finished product is already located in the second press tool 78. With this embodiment, the cooling can take place in the second press tool 70 when this is partly closed such that in said second press tool 70 a channel-like space is formed between the second tool part 72 and the surface Z1-1, Z2-1 of the decorative layer. According to this embodiment of the method, a cooling medium and for example wet steam is introduced into this space. In principle, the cooling process can take place between the process states "press tool 20 opened" and "press tool 70 closing". The cooling-down of the intermediate product surface Z1-1, Z2-1 can also be carried out through normal convection.

According to the invention, the semi-finished product feeding device 30 assigned to the first press tool 20 need not be part of the device V according to the invention for producing an interior covering part P and is thus provided optionally according to the invention. In FIG. 1, the semi-finished product feeding device 30 has a first semi-finished product feeding device 31 in the form of a conveying device for providing and supplying the semi-finished product 12 provided for forming the decorative layer 2 of a product to the first shaping forming surface 21a of the first tool part 21 and optionally a second semi-finished product feeding device 32 in the form of an unreeling device for unreeling the semi-finished product 12 provided for forming the decorative layer 2, in order to provide the second shaping forming surface 22a of the second tool part 22 with this semi-finished product 12. The first semi-finished product feeding device 31 in the form of a conveying device can comprise movement kinematics with which the first semi-finished product feeding device 31 can be moved relative to the first press forming tool 20 and with respect to this, can be moved towards and away from the latter. In this way, a semi-finished product 12 located on the first semi-finished product feeding device 21 for forming the decorative layer 2 can be transferred to the first tool part 21 and placed onto the first shaping forming surface 21a of the first tool part 21.

According to the invention, it can also be provided that the semi-finished product 12 provided for forming the decorative layer 2 is fed to the second shaping forming surface 22a of the second tool part 22 in particular by means of the second semi-finished product feeding device 32 already in the trimmed form, for example by means of a clamping frame.

In the embodiment of the second semi-finished product feeding device 22 with an unreeling device 32, the latter can be formed of a plurality of pairs 32b, 32c of feeding or holding reels as shown in FIG. 1. Here, the reels of a pair are arranged such that the semi-finished product 12 can be passed through the reel pairs and in the process held by the reel pairs. One or both reels of a pair can be motorically driven in order to bring about the feeding of the respective semi-finished product 12 to the second tool part 22 or a holding device 22d such as for example a clamping frame. The second semi-finished product feeding device 22 can comprise further feeding reels which can receive the semi-finished product 12, passing it on in the direction of the second shaping forming surface 22a of the second tool part 22. The holding device 35 can comprise a clamping frame and optionally also movement kinematics, with which the clamping frame can be moved relative to the second tool part 22. Because of this it can be provided in particular that the semi-finished product 12 is initially placed onto the holding device 32d or the clamping frame and that the holding device 32d or the clamping frame can be moved relative to the second tool part by means of movement kinematics in such a manner that the semi-finished product 12 can be placed against the second shaping forming surface 22a of the second tool part 22.

According to the invention, the device V according to the invention for producing an interior covering part P can comprise a cutting device 22, which has the function of a length cutting device, i.e. with which the semi-finished product 12 provided by an unreeling device 32b, 32c can be cut into sections and thus divided and in this form transferred to the second tool part 22. Each section in this case has a form which corresponds to the dimension of the shaping forming surface 22a of the second tool part 22, so that it can be used in each case for the pressing method provided with the press tool 20.

Prior to closing the press tool 20, the sandwich of the semi-finished product 12 provided for forming the decorative layer 2 or a film and of the semi-finished product 11 provided for forming the substrate 1 or a fibre mat rests on the tool part 21. Here, the sandwich can be held with a clamping frame. The tool surface 22a is heated up. Premature touching of the film with the hot tool surface 22a should be avoided since this would immediately destroy the film.

Preferentially, the two tool parts 22a, 22b of the first press tool 20 each have a heater for calibrating the fibre mat.

Independently of this, the first and/or second tool part 71, 72 can optionally comprise a heating device 75 and 76 respectively, as is schematically shown in FIG. 5.

The first and the second shaping forming surface 21a and 22a of the first press tool 20 can each be embodied as a flat surface. In this case, only a pressing of substrate and decorative layer, however no forming takes place (FIGS. 1, 2) and for the treatment of the intermediate product Z1 in the cooling device 50 an intermediate product with contours of the surfaces of said intermediate product having a flat course is present.

In an alternative embodiment of the device V (FIGS. 5, 6), the first and the second shaping forming surface 21a and 22a respectively of the first press tool 20 is embodied with surface contours which are curved and uniform and in particular run equidistantly with respect to one another in such a manner that the intermediate product is formed in its contour through the locking-up of the tool parts 71, 72. Accordingly, an intermediate product Z2 with surface contours following a curved course is then present in the cooling device 50.

During the pressing method in the first press tool 20, the semi-finished products 11, 12 are pressed through the locking-up of the tool parts 21, 22 and optionally formed in their shape not in their surface contour (FIG. 2) or optionally additionally formed in their surface contour (FIG. 5). By suitably heating the tool parts 22*a*, 22*b* of the first press tool 20 by means of the heaters of these, the semi-finished products 11, 12 are heated in such a manner that the yield points of the materials of both semi-finished products are initially reached.

By locking-up the two tool parts 21 and 22 and carrying out a pressing step (FIGS. 2 and 6 respectively), a materially joined connection between carrier component and the decorative film is produced for forming an intermediate product Z1 and Z2 respectively. For subjecting the semi-finished products 11, 12 to temperature, a heating device 25 is integrated in the first tool part 21 and a heating device 26 in the second tool part 22.

According to an embodiment of the method according to the invention or the device V according to the invention, a connecting of the semi-finished products 11, 12 and a partial forming at a first temperature, whose value is between 180 and 185° C. is carried out in the first press tool 20. In an embodiment according to the invention, approximately the same temperature is present in the semi-finished products 11, 12 in this first step, wherein this temperature is present within precision limits with a deviation of ±5° Celsius.

Furthermore, the blank is subjected to a further forming in the second press tool 70, 270, with which it is brought to a final dimension of the product to be produced, so that the surface contour forming operation is completed.

Preferentially, the tool parts 71, 72 of the second press tool 70 have no heating devices. In particular applications, these can comprise a cooling device. The temperature of the tool parts 71, 72 is provided such that the intermediate product upon its removal from the second press tool 70 has a maximum temperature of 80 degree Celsius in order to obtain a stable product P.

According to an embodiment of the method according to the invention it can be provided that the material of the carrier part semi-finished product has a thermoplastic material, which is identical to or similar to the thermoplastic material, which is present in the semi-finished decorative layer product, so that the carrier part semi-finished product and the semi-finished decorative layer product because of this have a substantially same yield point or softening temperature. However, different thermoplastics can also be used for the carrier part semi-finished product and for the semi-finished decorative layer product. In such a case, the carrier part semi-finished product and the semi-finished decorative layer product have different yield points and softening temperatures. It can be provided, in particular, that in this case the thermoplastics are selected so that the thermoplastic of the semi-finished decorative layer product has a yield point or softening temperature that is in particular 10 degree Celsius higher than the thermoplastic of the carrier part semi-finished product. Thus, the temperature differential between the first and the second temperature can be reduced to a minimum dimension, which on the other hand is required in order to avoid an undesirable indentation of the surface texture of the semi-finished decorative layer product.

The cooling device 50 provided according to the invention comprises an output device for applying a coolant onto the first surface Z1-1, Z2-1 of the intermediate product Z1, Z2 and in particular in the form of a spraying device 51 for spraying a coolant onto the first surface Z1-1, Z2-1 of the intermediate product Z1, Z2. With the output device or spraying device 51, the coolant according to the invention is applied onto the first surface Z1-1, Z2-1 of the intermediate product Z1, Z2. It is provided, in particular, that with a spraying device 51 a coolant is sprayed onto the first surface Z1-1, Z2-1 of the intermediate product Z1, Z2. The coolant application in this case is to take place very evenly so that according to the invention gaseous or vaporous cooling media are preferentially used.

By applying the coolant onto the first surface Z1-1, Z2-1 of the intermediate product Z1, Z2 it is achieved in particular that the decorative layer Z12, Z22 is cooled down at least in the region of the surface Z1-1, Z2-1. According to the invention it is provided in particular that the intermediate product Z1, Z2 is applied in such a manner that at least the thickness portion DA1*b* which faces the output device and running on the first surface Z1-1, Z2-1 and along the latter of the intermediate product Z1, Z2, is cooled down by at least 15 degrees Celsius at least in portions. Thus, the core temperature of the carrier component remains substantially constant.

It can be provided, in particular, that by applying the coolant onto the first surface Z1-1, Z2-1 of the intermediate product Z1, Z2 the temperature of the first surface Z1-1, Z2-1 is reduced by at least 10 degrees Celsius.

The thickness portion DA1*b* can in particular be a thickness portion which extends in the depth direction T of the intermediate product Z1, Z2 over a maximum of 50% of the local thickness d2 of the decorative layer Z12, Z22 of the intermediate product Z1, Z2, wherein the thickness portion seen in the longitudinal direction L of the intermediate product Z1, Z2 extends along the first surface Z1-1, Z2-1. In the sectional representation of the FIG. 10, the substrate Z11 and the decorative layer Z12 of the intermediate product Z1 is shown for an intermediate product Z1 produced according to the production device of FIG. 2. For the decorative layer Z12, a layer plane S1*a* can be defined with respect to the reduction of the temperature that occurs in the decorative layer Z12 that is achieved with the cooling device 50 up to which a temperature reduction is substantially achieved and effective. The layer plane S1*a* runs at a distance d1 from the first surface Z1-1. Furthermore, a layer plane S1*b* can be defined, which has a distance d3 from the first surface Z1-1. According to the invention, a cooling down of the decorative layer Z12, Z22 takes place such that the layer between the layer plane S1*b* and the first surface Z1-1 has a temperature which is at least 15 degree Celsius lower than the substrate Z11, Z21.

The cooling device 50 can comprise an output device 53, which can in particular be arranged on a guiding device 55, with which the output device 53 can be positioned along the surface Z1-1, Z2-1, in order to be able to apply coolant onto the latter over the full area or predefined portions of the respective intermediate product Z1, Z2. A feed line 57 connects a coolant storage unit to the output device 53, so that cooling medium can be fed to the output device 53 through the line 57. The output device is arranged with respect to the decorative layer Z1-1 in such a manner that the coolant is applied and for example sprayed onto the surface of the latter. Here it can be provided that the intermediate product Z1, Z2 is positioned on a feeding device or conveying device 55, with which the intermediate product can be removed from the first press tool and fed to the second press tool 70.

The cooling device allows for example cooling down the decorative film so far that its temperature is below the yield point or softening temperature. This means that the cooling device serves to cool the decorative film down from the first temperature of for example 180 to 185° C. to a second temperature of approximately 160° C. The first and/or the second calibrating tool half can comprise a surface with non-stick coating in order to ensure that carrier component or decorative film do not stick to one of the two calibrating press forming tool halves when opening the calibrating press forming tool, thereby being undesirably deformed.

The cooling device can comprise a coolant circuit in which a refrigeration device is included in order to cool down the coolant. The cooling device can make use of gaseous coolants, such as for example air or pure nitrogen as coolant. Water for example can be used as a liquid coolant. Preferentially it is provided that the cooling device comprises a spraying head for applying coolant, in particular a liquid coolant, at least onto the decorative film. With the spraying head, the coolant can be applied to the decorative film after the opening of the press forming tool by removing one of the two press forming tool halves.

With the spraying head, water as coolant can be applied onto the side of the blank on which the decorative film is located, in order to cool said decorative film down from the first temperature of 180 to 185° by approximately 20 to 25° C. to the second temperature of approximately 160° C. The spraying head has a multiplicity of outlet openings for water. The spraying head is embodied in such a manner that cooling medium and in particular water leaves said spraying head as a mist with fine droplets.

Preferentially it is provided that between the first step and the second step at least the decorative film is subjected to a coolant. To increase the cooling output, the coolant can be conducted through a heat exchanger which is connected to a refrigeration machine. Thus, a particularly rapid cooling-down can be achieved, which again reduces the production time.

When using a cooling medium with a temperature between 10° C. and 18° C., i.e. when using for example piped water at normal temperatures, the cooling output that is supplied to the respective intermediate product with the cooling medium according to the invention is already too high when visible water droplets remain on the film surface. The 3D-formability in the second press tool 70 is then no longer possible, or only to a highly conditional degree.

The coolant that is used can be gaseous, e.g. air but also inert gas, such as for example pure nitrogen in order to stop undesirable chemical reactions. Preferentially, at least the decorative film is subjected to a liquid coolant. Water can be used for example as liquid coolant.

A coolant, whose boiling point is below the first and/or the second temperature, can be used as a coolant, so that the liquid coolant evaporates on contact. It is advantageous, furthermore, when the coolant evaporates, since because of this it is prevented that remnants of the coolant remain on the decorative film. Because of this, a homogeneous temperature distribution can be ensured on the surface and excessive cooling down of the carrier component can be avoided.

A target and measure according to the invention for applying coolant can be that the temperature in the portion DA1b is lowered by 20 to 25° C. to a second temperature T2 of approximately 160° C., i.e. below the softening temperature of the thermoplastics. By contrast, the temperature in the region of the carrier component 1 of the blank 3 should remain in the range of the first temperature T1 from 180 to 185° C., which is ensured in that the coolant is applied relatively briefly to the surface of the decorative layer.

According to the invention it can be provided that in the second press tool no heating of the intermediate product is carried out, so that an embodiment of the second press tool 70 comprises no heater.

According to the invention, a method for producing an interior covering part P with a carrier component 1 of a fibre moulding material, in particular a natural fibre moulding material, and a decorative film 2 is provided, comprising the steps:
  in a first press tool 20 with two tool parts 22a, 22b, carrying out a first pressing together and forming of a semi-finished product 11 provided for forming the substrate 1 a semi-finished product 12 provided for forming the decorative layer 2 subject to forming a texture of a first surface of the decorative layer 2 and because of this forming of an intermediate product Z1, Z2 with a first forming state; and
  cooling down of at least one thickness part region of the cross section of a decorative layer portion of the intermediate product Z1, Z2 by cooling down a first surface Z1-1, Z1-2; Z2-1, Z2-2 of the same by means of a cooling medium,
  in a second press tool 70 with two tool parts 71, 72, carrying out a second pressing together and further forming of the substrate 11 and of the decorative layer 2, the thickness part region of the decorative layer portion located on the surface of which has a lower temperature because of the cooling than during the forming in the first press tool, so that a method end product P; Z11, Z12; Z21, Z22 with a second forming state is formed.

The invention claimed is:
1. A method for producing an interior covering part with a carrier component of a fiber molding material and a decorative film, comprising the steps:
  in a first press tool with two tool parts, carrying out a first pressing together and forming of a substrate semi-finished layer provided for forming the carrier component of a semi-finished decorative layer product provided for forming the decorative film, and adjusting a temperature so that a softening temperature of a material of the substrate semi-finished layer and a softening temperature of a material of the semi-finished decorative layer product are achieved, wherein the first pressing is executed with or without deformation;
  opening the first press tool and at the same time forming a texturing of a textured first surface of the semi-finished decorative layer product by separating the semi-finished decorative layer product from a second shaping forming surface of the first press tool and thereby forming an intermediate product which comprises the substrate semi-finished layer and the semi-finished decorative layer product with the textured first surface;
  applying a coolant with a cooling device onto the textured first surface of the intermediate product and thereby cooling at least one thickness part region of a cross-section of an intermediate product portion of the intermediate product for stabilization of the texturing of the textured first surface of the semi-finished decorative layer product, wherein the at least one thickness part region is situated at the textured first surface of the intermediate product; and
  in a second press tool with two tool parts, carrying out a second pressing together and further forming of the semi-finished substrate layer and of the semi-finished decorative layer product so that the interior covering part is formed as a manufacturing end product.
2. The method according to claim 1, wherein the cooling medium is formed of water.
3. The method according to claim 1, wherein the second shaping forming surface of the first press tool, which is provided for receiving the semi-finished decorative layer product, is coated with a non-stick layer.

4. The method according to claim 1, wherein the intermediate product during the opening of the first press tool is altogether a really held in a constant position between the tool parts of the first press tool.

5. The method according to claim 1, wherein as material for the substrate semi-finished layer a fiber molding material with a grammage of 80 to 4,000 g/m$^2$ is used.

6. The method according to claim 1, wherein as material for the substrate semi-finished layer a fiber molding material is used, which comprises natural fibers with a component of 40% by weight to 60%by weight, in each case based on its total weight and fibers of one or a plurality of thermoplastic polymers with a component of 60% by weight to 40% by weight.

7. The method according to claim 1, wherein the first pressing comprises a contour deformation of the substrate semi-finished layer and the semi-finished decorative layer product so that the intermediate product is curved in a planar extension of the intermediate product.

* * * * *